United States Patent
Saldana

(10) Patent No.: US 10,709,141 B2
(45) Date of Patent: Jul. 14, 2020

(54) DEVICE TO PREPARE TURNOVERS

(71) Applicant: Alejandra Isabel Saldana, Austin, TX (US)

(72) Inventor: Alejandra Isabel Saldana, Austin, TX (US)

( * ) Notice: Subject to any disclaimer, the term of this patent is extended or adjusted under 35 U.S.C. 154(b) by 332 days.

(21) Appl. No.: 15/835,578

(22) Filed: Dec. 8, 2017

(65) Prior Publication Data

US 2018/0206506 A1    Jul. 26, 2018

Related U.S. Application Data

(63) Continuation-in-part of application No. 15/229,428, filed on Aug. 5, 2016.

(51) Int. Cl.
*A21C 11/00* (2006.01)
*A21C 9/06* (2006.01)

(52) U.S. Cl.
CPC ............... *A21C 9/063* (2013.01); *A21C 9/06* (2013.01); *A21C 11/006* (2013.01); *A21C 9/066* (2013.01); *A21C 11/004* (2013.01)

(58) Field of Classification Search
CPC ...... A21C 11/006; A21C 11/004; A21C 11/08
USPC .......... 99/349, 353, 432; 425/385, 394, 408, 425/409, 418
See application file for complete search history.

(56) References Cited

U.S. PATENT DOCUMENTS

| | | | | |
|---|---|---|---|---|
| 5,253,565 A | * | 10/1993 | Burton | A47J 37/0611 219/524 |
| 5,642,659 A | * | 7/1997 | Sesona | A47J 37/0611 99/376 |
| 5,983,784 A | * | 11/1999 | Goldberg | A47J 37/0611 99/372 |
| 6,205,914 B1 | * | 3/2001 | McCarney | A21C 11/006 425/385 |
| 9,913,481 B2 | * | 3/2018 | McCarney | A21C 11/006 |

* cited by examiner

*Primary Examiner* — Reginald Alexander

(57) ABSTRACT

Device to prepare turnovers which has a base element, a top contact element, and lever for closing. The base element has two parts which are joined by two hinges. One part is fixed and the other one performs a 180° opening and closing movement to form the turnover. This movable part has engravings on its interior surrounding walls which are marked in the dough when the two parts come together to form the pie. The outer edge of the periphery of the base element has a slope that serves to cut the dough excess of the turnovers. When the lever presses the top contact element against the base element a concave tortilla will form. Then, the concave tortilla is stuffed with your choice of filling and the movable part closes to form the turnover. Finally, the movable part opens and the turnover is taken out.

6 Claims, 9 Drawing Sheets

DEVICE TO PREPARE TURNOVERS

BACKGROUND OF THE INVENTION

There are some similar products in the market however, this invention is a novelty product, since it has concave surfaces which allow the appropriate accommodation of the food to be prepared. In addition, it has a lever that make sure that a similar quantity of the product is evenly distributed in each production cycle.

BRIEF SUMMARY OF THE SPECIFICATION

The present invention changes and improves the conventional way to prepare turnovers. The device to prepare turnovers consists of a base element of circular shape A(1) with a flat bottom. On one half of its top surface, is a concave semicircular piece at a slightly elevated level and the other half is a flat surface at a lower level. This element has four hinges (12), (13), and (14) located on opposite sides. Two of these hinges (13) hold a concave semicircle movable part which performs a movement of opening and closing with regard to the base element. Furthermore, when this movable part is in closed position the turnover is formed.

The third hinge (14) is attached to a top contact element of a concave circular shape on its upper facing surface. When the top contact element is being pressed against the base element, a concave tortilla will be formed. The fourth hinge is connected to a lever (12) which, upon closing, makes contact with the upper surface of the top element. This element, when manipulated, will create pressure and will ensure the perfect closure of the three elements.

An advantage of the device that prepares turnovers is that it allows the production of concave tortillas to be made of the same size.

Another advantage of the present device is that all the turnovers will come out the same size.

Another advantage is that it will allow you to enclose something in dough to bake in the oven. To help prepare food, this device makes a hollow space within the dough to be filled with a salty or sweet preparation according to the preference of the cook.

Another advantage is that the Device to Prepare Turnovers has a lever (11) that can be used to flatten the dough. When manipulated this lever element ensures the perfect closure of the base A(1) and top contact elements (10). When the lever presses the top contact element (10) against the base element A(1), a concave tortilla will form.

BRIEF DESCRIPTION OF THE DRAWINGS

There are some similar products on the market; however, this invention is a novelty product, since it has concave surfaces which allow the appropriate accommodation of the food to be prepared. In addition, it has a lever that makes sure that a similar quantity of the product is evenly distributed in each production cycle.

Model 1

Model 2 (Leaves)

Figure 1:
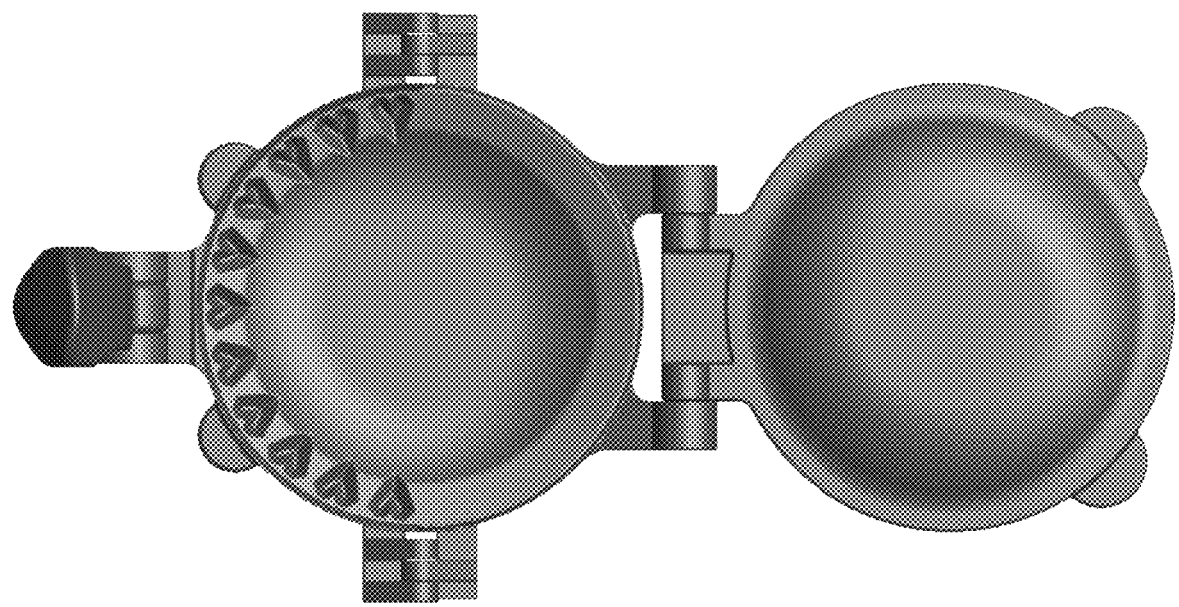
FIG. 1 shows a perspective view of the device to prepare turnovers in closed position.

FIG. 1 shows a perspective view of the device to prepare turnovers in open position and with the concave half circle (part B) in open position.

Figure 2:
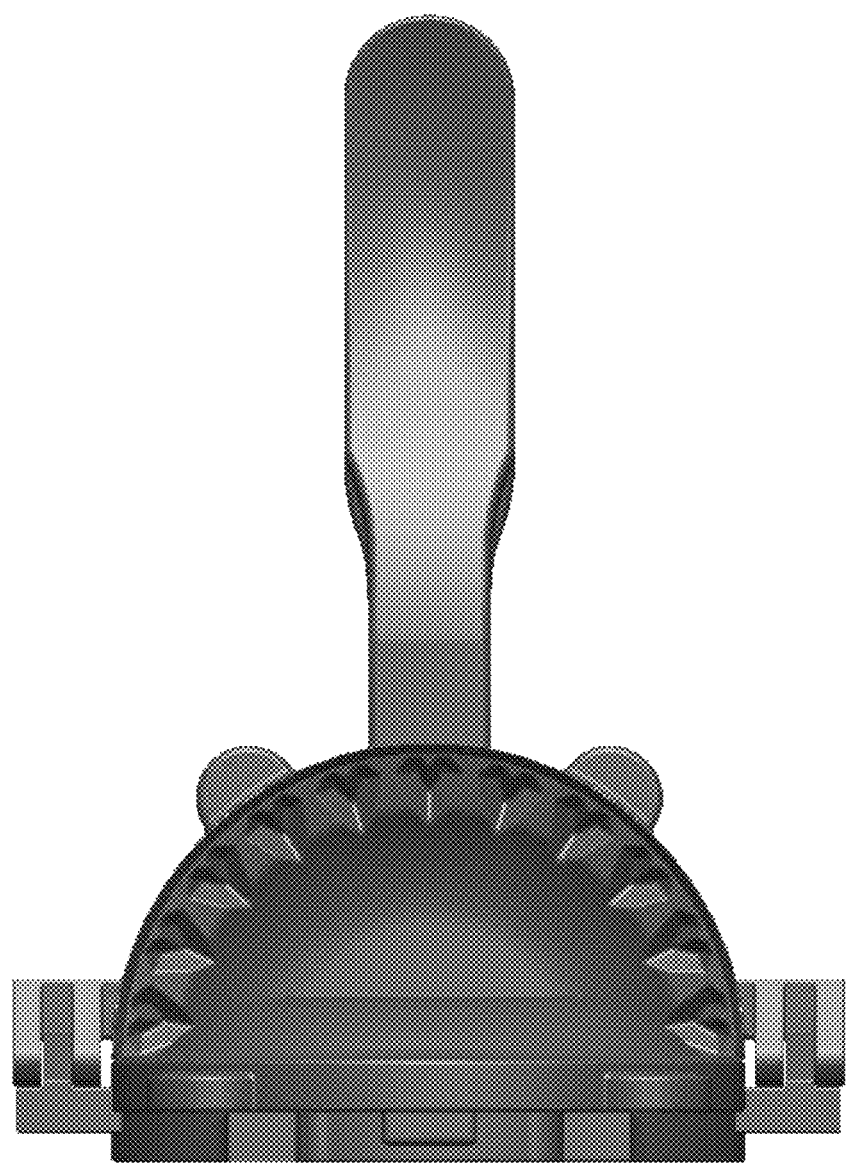
FIG. 2 shows a top view of the device to prepare turnovers in open position.
Figure 3:
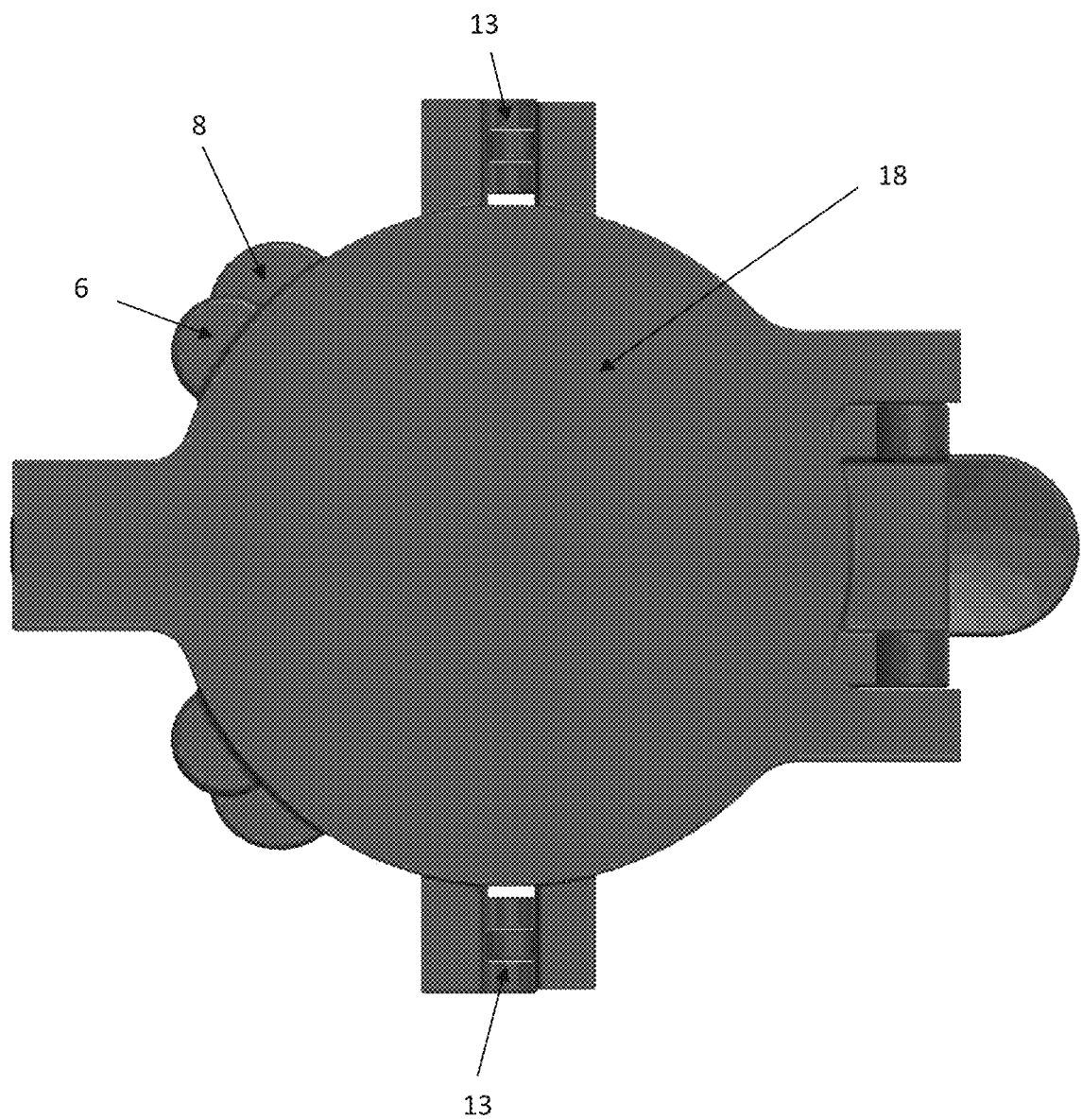
FIG. 3 shows a bottom view of the device to prepare turnovers.
Figure 4:
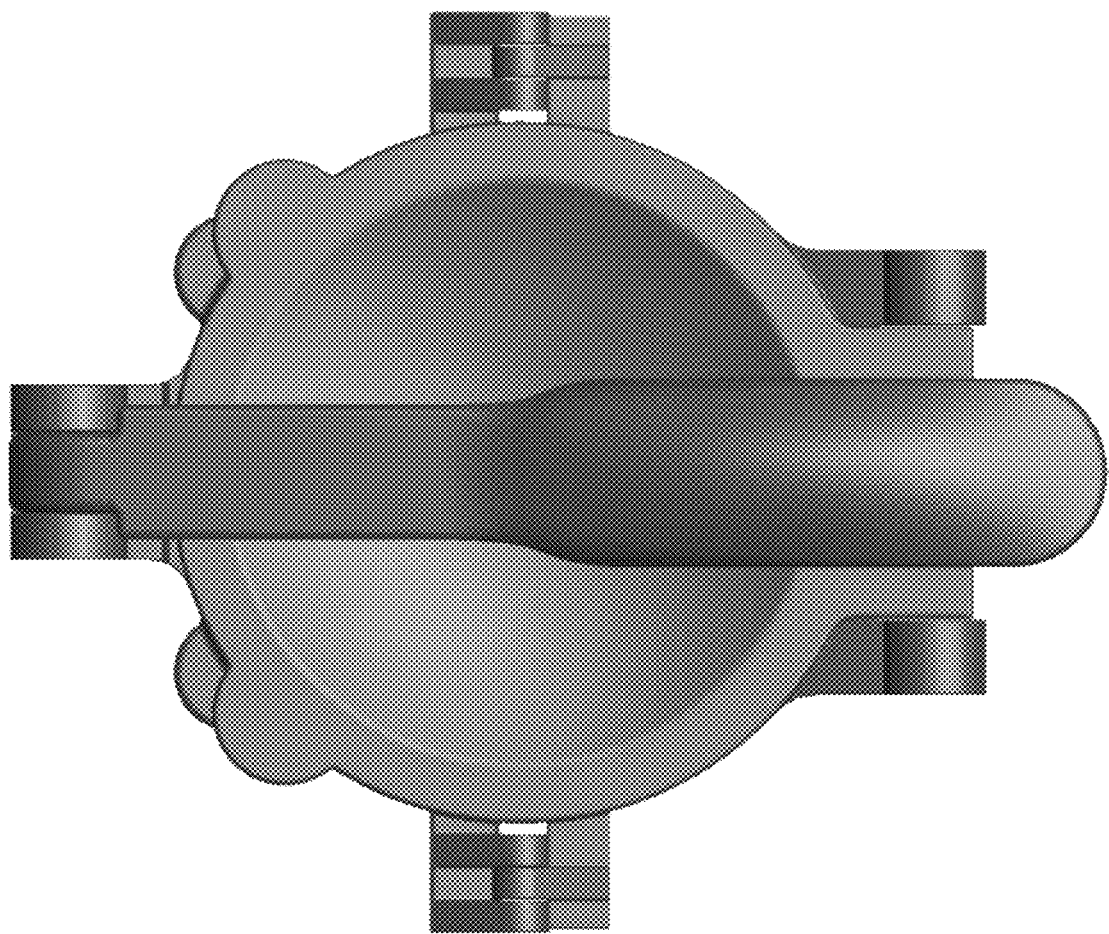
FIG. 4 shows a top view of the device to prepare turnovers in closed position.
Figure 5:
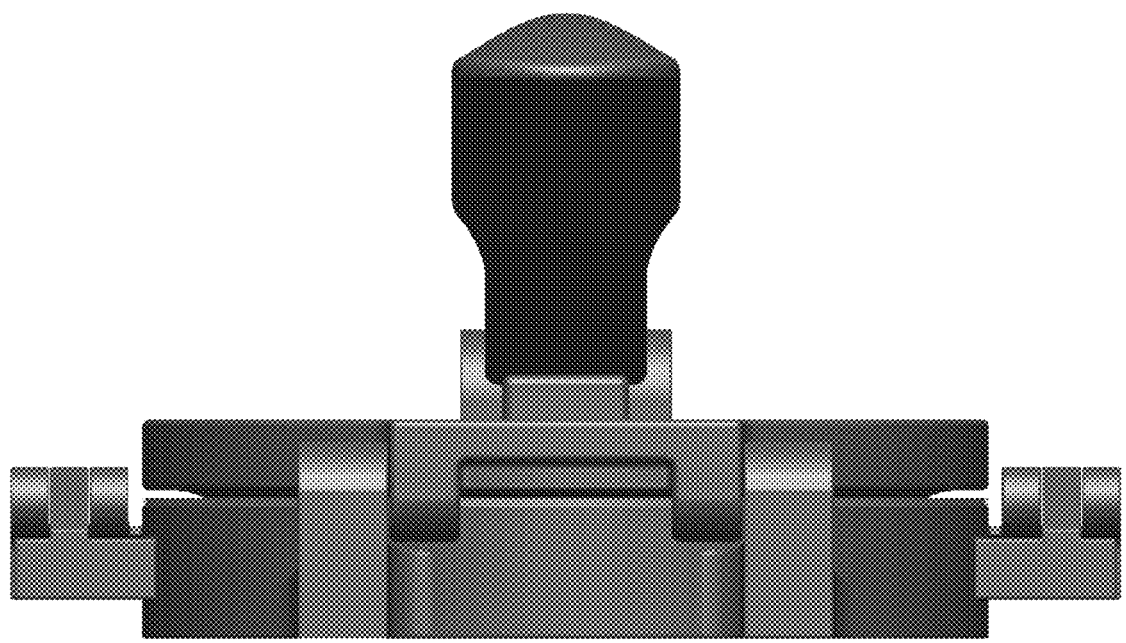
FIG. 5 shows a back view of the device to prepare turnovers.
Figure 6:
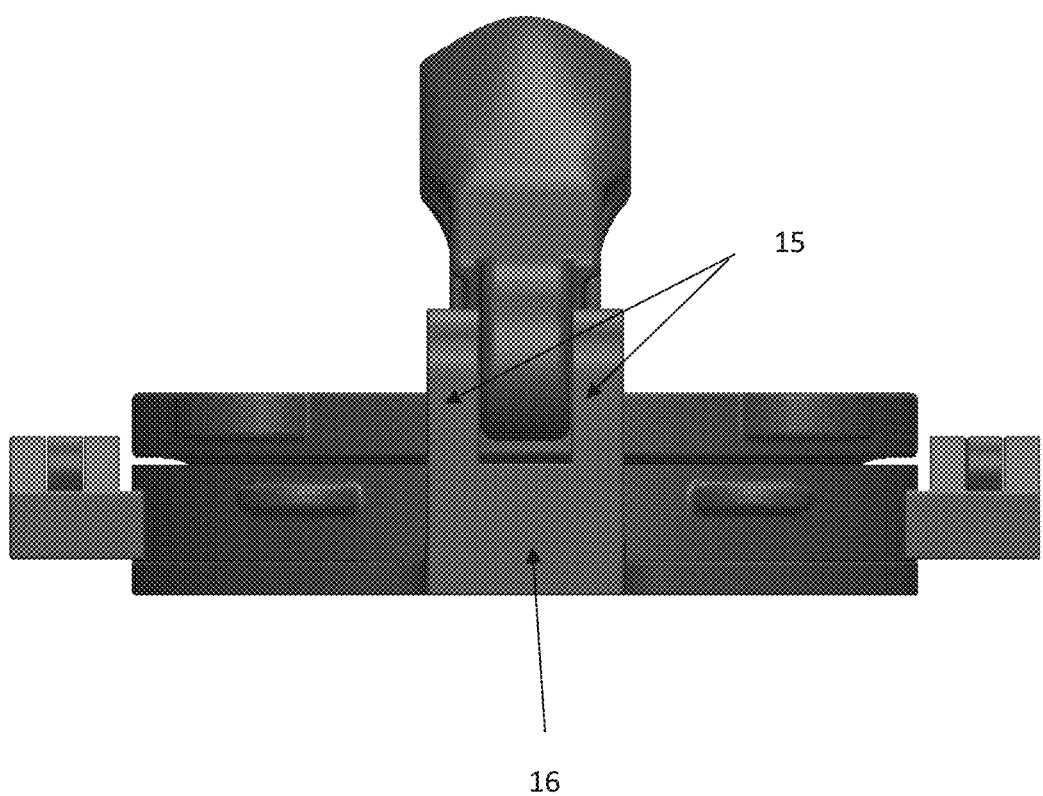
FIG. 6 shows a front view of the device to prepare turnovers.
Figure 7:
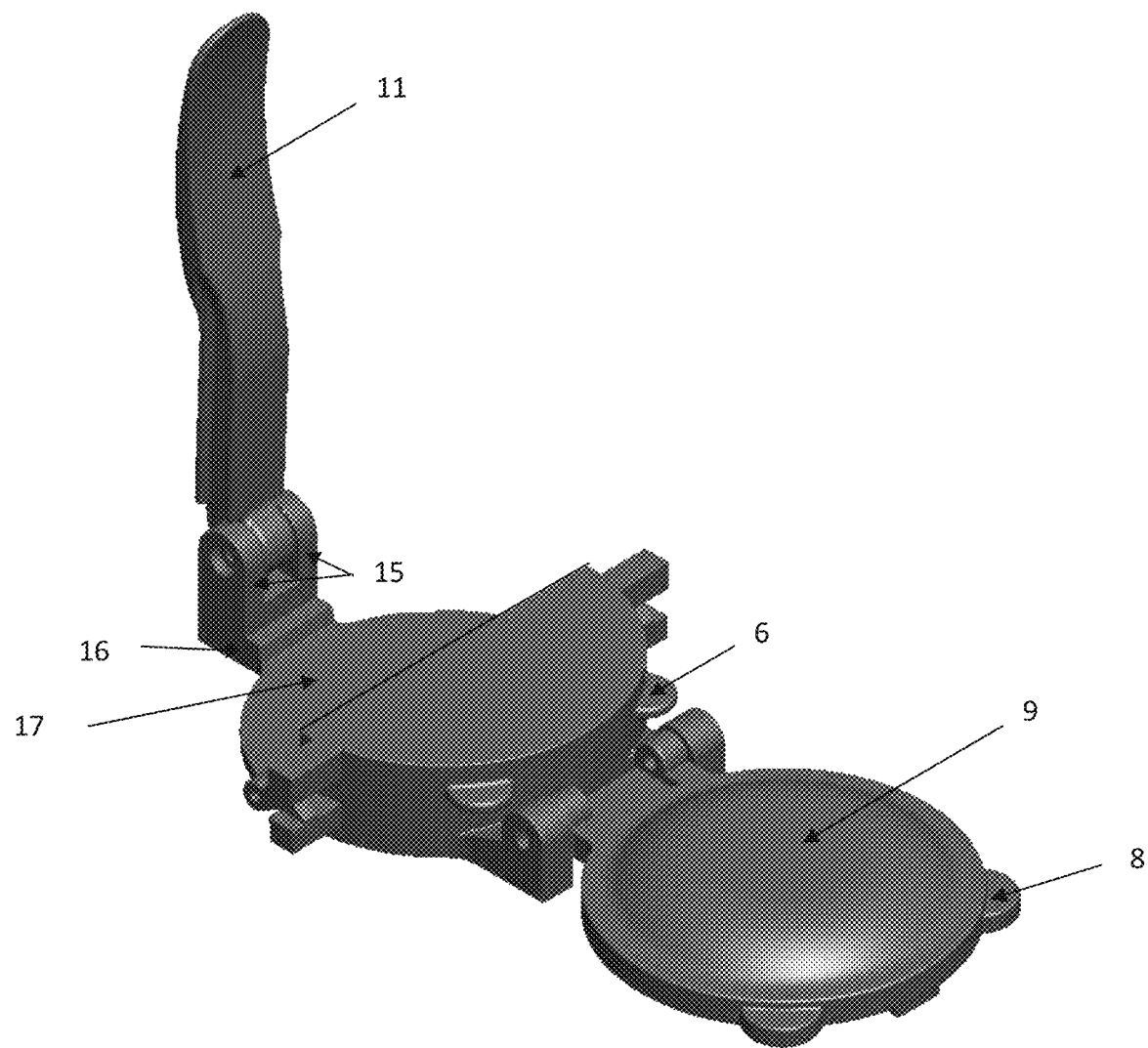
FIG. 7 shows a perspective view of the device to prepare turnovers with the superior surface open and with the half of the folded base.
Figure 8:
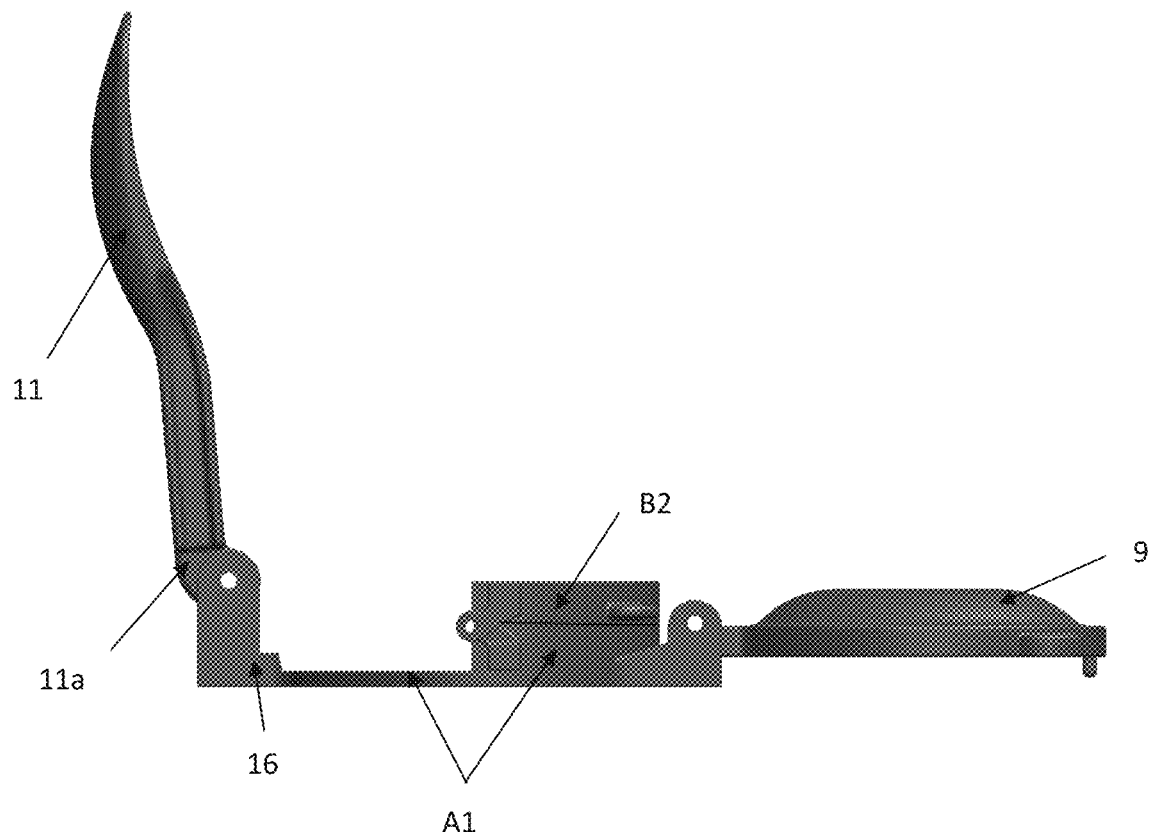
FIG. 8 shows a side view of the device to prepare turnovers with the superior surface open and with the half of the folded base.
Figure 9:
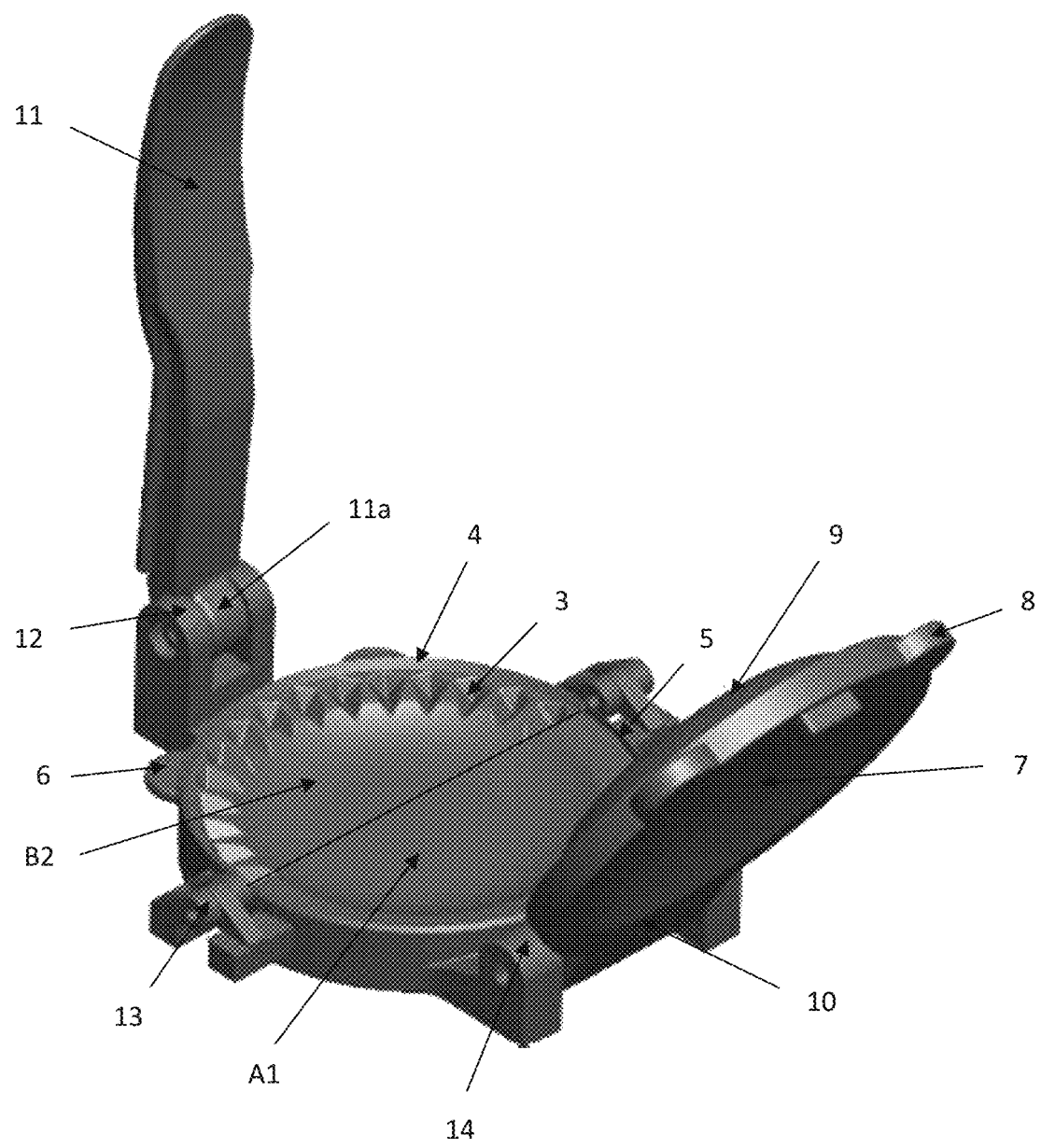
FIG. 9 shows a numbered perspective view of the device to prepare turnovers in open position.

FIG. 2 shows a perspective view of the device to prepare turnovers in open position.

Model 3 (Hearts)

FIG. 1 shows a top view of the device to prepare turnovers in open position.

FIG. 2 shows a back view of the device to prepare turnovers in open position and with the concave half-circle (part B) in open position.

DETAIL DESCRIPTION OF THE INVENTION

A description of my invention is the following: A device to prepare turnovers which is comprised of a base element A(1). On its surface is a concave semicircular piece at a slightly elevated level and a flat surface at a lower level, with a flat base on its lower surface. This element has 4 hinges: The first, a single-unit hinge. Directly across from the first are two pieces that, when connected to the top contact element, form the second hinge. The third and fourth hinges are located perpendicular to the first and second hinges, on either side of the circle's diameter. The invention has a concave semicircle element B(2) that is attached to the base element and is situated upon the flat surface of the lower elevation (17). This piece B(2) has three variations of itself, each of which will change the look of the turnover's sealed rim. The pieces will have either engravings of kites, leaves, or hearts bordering the interior semicircular wall. The B(2) element is joined to the base element by two hinges (13) and has two handles, both which allow the opening and closing of this element. Additionally, it has an inwardly inclined slope (5) that has been added to the outer edge of the concave semicircle of the base element A(1) as well as an outwardly inclined slope (4) that has been added to the outer edge of the second concave semicircle piece B(2). These pieces, when joined, cut off the turnovers' excess dough, and simultaneously seal and engrave the dough with patterns of kites, leaves or hearts. The device is provided with a top element (10) of a circular concave shape on its upper facing surface (7) and, therefore, a convex shape on its lower facing surface (9). This single piece is attached to part A(1) via a fastening hinge (14) which allows the top element to open and close. The device has a lever (11) that, upon closing, makes contact with the upper surface of the top element (10), joined to part A(1) by yet another fastening hinge. This element, when manipulated, will create pressure and will ensure the perfect closure of the three elements.

For its functionality, it is a simple device of curved shape which the contact surfaces of both elements resemble two dishes overlapping. The lower concave surfaces, part A and B are divided into two halves, that eventually will fold in half to give shape to the dough. The semicircle surface B(2)

has engraved designs, specifically made to form the sealed decorated turnover rim of the turnovers. The top element 10) has a smooth surface and used to press and form the dough into a tortilla shape that will be filled before it is sealed.

This invention will preferably be made of plastic, wood, aluminum and cast iron or it can be made of any suitable material.

The person who uses this device to make turnovers will no longer have to use 2 or 3 different devices, greatly reducing the preparation time.

This utensil can be used for domestic and/or commercial use. The benefit it provides to the user is that it saves time and effort in making the turnovers.

Hinge descriptions, locations and functions: The top contact element (10) is connected by the hinge (14) to the base element A(1) and is oriented on the back view of the device to prepare turnovers. A second hinge (12), connects the lever (11) to the base element A(1). This second hinge has two upstanding parallel sides (15) and a base portion (16) which is attached to the base element A(1) by the side of the flat surface (17). The lever portion (12b) is connected via a hinge to the upright parallel sides and performs an opening and closing movement. Hinges (13) are located on either side of the base element diameter.

Detail Description of the Invention Changes

I change the lever to another position which allowed me to remove the truncated cone shape element from the level in order to better catch the level, and also to be able to make more pressure and as a result, have a better distribution of the dough.

The device to prepare turnovers had a concave circular base element on its upper surface and with patterned engravings of gradual undulations bordering the interior peripheral wall and a flat base on its lower surface that was replaced by a concave semicircular piece on a slightly elevated level with a semicircular flat surface at a lower level and a flat base. In making this new piece, I was able to change the level to another position. This new piece gives the user more leverage over the level to create greater pressure when the dough is flattened.

This device had a pattern of gradual undulations which did not allow the top circular concave element (10) to close all the way to and flatten the dough properly. The new improvements include replacing the previous gradual undulations with peripheral engravings on the interior wall of the B(2) element and a smooth surface on the interior wall of the element A(1), allowing full closure of the top and base elements when vertical pressure is applied to the lever.

The device to prepare turnovers did not have any type of handle in the concave semicircle B(2). In this device, I added two handles to the concave semicircle B(2) to facilitate the movement of opening and closing of this element.

The hinges (13) that facilitate the movement of the opening and closing to form the turnover have been substituted for stronger ones in order to make a more durable device.

The invention claimed is:

1. A device for food processing comprising: a base element of a circular shape, the base element comprising: a flat lower surface; and an upper surface which includes a first concave semicircle elevated above the lower surface, and a second flat semicircle adjacent to the first concave semicircle but at a lower elevation than the first concave semicircle; a movable concave semicircle rotatably supported on the second flat concave semicircle and mateable with the first concave semicircle; a top contact element rotatably attached to the base element, the top contact element having a circular concave shape on an upper facing surface and a convex shape on a lower facing surface used to work in relation with the base element; first and second hinges located on opposed sides of a diameter of the base element, the first and second hinges rotatably connecting the movable concave semicircle to the base element; third and fourth hinges located on opposed sides of the base element, the third hinge rotatably connecting the top contact element to the base element; a lever rotatably attached to the fourth hinge; wherein the movable concave semicircle is placed in a closed position with the first concave semicircle to form a turnover, the top contact element is used to work in relation with the base element, and when the lever presses the top contact element against the base element a concave tortilla will form.

2. The device for food processing of claim 1, wherein the movable concave semicircle is attached to the base element and is situated upon the flat surface at the lower elevation; the moveable concave semicircle comprising engravings located on an interior surroundings wall of the concave semicircle which is joined to the base element by two of the four hinges which allow it to have a movement of opening and closing.

3. The device for food processing of claim 1, wherein the top contact is attached to one side of the base element via a fastening hinge which allows the top element to perform a movement of opening and closing with regard to the base element; the top contact element comprising a smooth surface designed to press dough and to form the dough into a shape of the concave tortilla with one movement of pressing the dough with the lever.

4. The device for food processing of claim 1, wherein the lever is joined by a fastening hinge to the base element on an opposite side of the hinge connecting to the top contact element and the lever ensures a perfect closure of the base element and the top element when manipulated.

5. The device for food processing of claim 1, wherein two slight slopes have been added to a periphery of-the concave semicircle formed by the base element and the moveable concave semicircle to cut dough excess of the turnovers, an inwardly inclined slope added to an outer edge of the concave semicircle of the base element and an outwardly inclined slope added to an outer edge of the moveable concave semicircle.

6. The device for food processing of claim 1, wherein four handles are located on the top contact element and on an edge of the concave semicircle that is located upon the flat surface at the lower elevation of the base element; the four handles designed to facilitate the movement of opening and closing.

* * * * *